US005835586A

United States Patent [19]
Skowronski

[11] Patent Number: 5,835,586
[45] Date of Patent: Nov. 10, 1998

[54] ARMREST TELEPHONE ASSEMBLY

[75] Inventor: Richard E. Skowronski, Elk Grove Village, Ill.

[73] Assignee: GTE Airfone Incorporated, Oak Brook, Ill.

[21] Appl. No.: 614,330

[22] Filed: Mar. 12, 1996

Related U.S. Application Data

[63] Continuation of Ser. No. 285,787, Aug. 4, 1994, abandoned.

[51] Int. Cl.⁶ .................................................. H04M 1/00
[52] U.S. Cl. .......................... 379/428; 379/455; 379/446
[58] Field of Search .................................. 379/485, 426, 379/446, 454, 428, 434, 62, 372, 376; 362/26

[56] References Cited

U.S. PATENT DOCUMENTS

| D. 322,438 | 12/1991 | Skowronski . | |
|---|---|---|---|
| D. 340,452 | 10/1993 | Skowronski . | |
| 4,536,622 | 8/1985 | Rieman | 379/376 |
| 4,811,387 | 3/1989 | Hollewed et al. . | |
| 4,881,254 | 11/1989 | Hollewed et al. . | |
| 4,965,824 | 10/1990 | Hollewed et al. . | |
| 4,977,592 | 12/1990 | Hollewed et al. . | |
| 5,087,906 | 2/1992 | Eaton et al. | 379/376 |
| 5,109,412 | 4/1992 | Hollewed et al. . | |
| 5,128,993 | 7/1992 | Skowronski . | |
| 5,155,766 | 10/1992 | Skowronski . | |
| 5,157,722 | 10/1992 | Hollewed et al. . | |
| 5,297,203 | 3/1994 | Rose et al. | 379/62 |
| 5,327,328 | 7/1994 | Simms et al. | 362/26 |
| 5,410,597 | 4/1995 | Kepley, III et al. | 379/455 |

FOREIGN PATENT DOCUMENTS

| 3542424 | 6/1987 | Germany | 379/454 |
|---|---|---|---|
| 42965 | 2/1989 | Japan | 379/434 |

*Primary Examiner*—Jack K. Chiang
*Attorney, Agent, or Firm*—Leonard C. Suchyta

[57] ABSTRACT

An armrest telephone assembly comprises an armrest unit and a telephone handset. The armrest unit includes an upper side and a lower side, and the armrest unit has a release mechanism mounted therein. The telephone handset includes a latching mechanism for releasably mounting the handset to the lower side of the armrest unit. The release mechanism of the armrest unit is mechanically linked to the latching mechanism of the handset such that the latching mechanism releases the handset from the lower side of the armrest unit in response to actuation of the release mechanism.

5 Claims, 5 Drawing Sheets

ARMREST TELEPHONE ASSEMBLY

This application is a file wrapper continuation of application Ser. No. 08/285,787, filed Aug. 4, 1994, now abandoned.

FIELD OF THE INVENTION

The present invention relates generally to assemblies for mounting telephones. More specifically, the present invention relates to an assembly for detachably mounting a telephone handset to a lower side of an armrest of a passenger seat found in a vehicle such as a commercial aircraft or train.

BACKGROUND OF THE INVENTION

Public pay telephones were introduced in the 1880's. In general, operation of such pay telephones required the deposit of a coin in order to unlock some mechanism, for example, the crank with which the user signalled the operator or a sliding door in front of the mouthpiece. On occasion, the entire telephone was enclosed in a locked box that could be opened only with the deposit of a coin, or a key. One arrangement reversed the usual scheme and enclosed the telephone in a booth having a door that locked behind the telephone user. After having made his or her call, the user could escape only by depositing a coin in the door lock. Only rarely did the early arrangements provide any means for refunding the user's payment in the event that the call could not be completed. An early attempt to remedy this difficulty relied on nothing more than a piece of string.

For many years, the common form of telephone pay station included several slots for the deposit of coins of varying denominations. A typical arrangement allowed the deposit of nickels, dimes and quarters so that payment of various amounts could be utilized in connection with the pay station. This arrangement was first used with so-called manual telephones in which often the initial deposit of a single coin worked to signal the operator that a call was sought to be placed. Additional coins were added for payment of calls of longer duration or for calls to long-distance locations. Internal arrangements of gongs transmitted various sounds back to the operator and gave the operator an indication of proper coin deposit.

Ultimately, telephone pay stations became dial operated, and an operator would normally not be required in order to place local calls. Various arrangements for actuating the equipment and for accepting and returning coins were developed, including ultimately, electronic totalizers that were able to count and accurately register the number and denomination of coins deposited. Such totalizers also facilitated the development and utilization of so-called single-slot pay stations, wherein a single slot accepted coins of various denominations, eliminating the traditional three-slot design that had been utilized for many years.

Pay telephones that accept credit cards represent a much more recent development that has found wide-spread use within the past decade. Such arrangements, typically found in airports, railroad stations, etc., have been well received by business travelers, largely because credit-card telephones mitigate the need to carry the many coins required to place telephone calls, particularly long-distance calls.

In the United States today, more people use public telephones more often than in any other country in the world, and the subsequent installation and adaptation of public telephones to different environments have been limited only by the imagination. As a result, significant experimentation has been done in connection with the deployment of pay telephones in other than conventional environments. The deployment of telephone pay stations on railcars, particularly on deluxe passenger trains, has been experimented with from time to time. However, the most recent development and adaptation of the pay station have permitted use in commercial aircraft. Credit-card accepting pay stations have been incorporated into commercial aircraft where, by means of radio-telephone links, telephone service can be had by the user from the commercial aircraft to ground based telephone equipment.

With regard to the placement of telephone pay stations on board commercial aircraft, the telephones themselves have sometimes been installed on bulkheads located adjacent to flight-attendant stations. This arrangement requires the user to leave his or her seat to go to the location of the on-board pay station to initiate the call. If the pay station is equipped with a wireless telephone unit, the flight attendant often becomes involved in providing the user with the hand-held telephone. Such arrangements fail to afford the convenience, and perhaps the privacy that an aircraft passenger might desire in connection with the placement of a call.

Telephones found on board commercial aircraft have also been detachably mounted to the back of a single passenger seat in each row of passenger seats. Typically, in a row of three passenger seats, the telephone is mounted in the seat back of the middle passenger seat. Although this arrangement does not require the user to leave his or her seat to use the telephone, the passenger situated in the middle passenger seat may be inconvenienced by a person in an adjacent passenger seat reaching across the area in front of the middle passenger seat to use the telephone. Furthermore, with the advent of personal video aboard commercial aircraft, video screens may be mounted in the back of the passenger seats. These video screens interfere with the placement of telephones in the seat backs.

One way to accommodate both personal video screens and telephones in the passenger seat area is to mount the telephones to the armrest of each passenger seat. For example, U.S. Pat. Nos. 4,965,824 and 4,977,592 to Hollowed et al. describe a telephone dispenser and latching mechanism mounted to the armrest of a passenger seat. The dispenser and latching mechanism secures the telephone in the dispenser and, in response to actuation by a telephone user, releases the telephone from the dispenser. The dispenser includes an elongated dispenser channel of generally longitudinal stepwise construction. The dispenser also includes an outer cover affixed substantially over the dispenser channel and a face plate secured to a first end of the outer cover. A latch plate is secured to a second end of the dispenser channel so that the dispenser channel, the outer cover, the face plate, and the latch plate cooperatively define a telephone-receiving cavity in which a hand-held telephone is secured when not in use. The face plate includes an opening providing access to the telephone-receiving cavity and a slot for the insertion of a credit card. A latch-release actuator is located behind the face plate slot and is mechanically linked to the latching mechanism. A credit card, once inserted into the slot, causes the latching mechanism to disengage from the telephone, permitting an ejector mechanism to urge the telephone out of the dispenser.

One drawback of the foregoing dispenser and latching mechanism is that the dispenser is not easily adaptable to armrests having different designs. For instance, since the dispenser is flat along its upper side, the armrest must be flat along much of its lower side in order for the dispenser to be properly mounted thereto. If the armrest is not flat, the dispenser must be modified to properly mount thereto.

Another drawback of the dispenser and latching mechanism is that it is bulky, obtrusive, and aesthetically non-appealing. The dispenser and latching mechanism conspicuously protrudes downward from the lower side of an armrest. If the armrest is rotated upward from its normal horizontal position to the vertical position, the dispenser and latching mechanism protrudes outward into the passenger seat area, thereby interfering with the comfort of the passenger.

Yet another drawback of the dispenser and latching mechanism is that it is not easily accessible and operable. The latch-release actuator is located below the armrest behind the face plate slot. In this position, the latch-release actuator is not visible to the passenger. Therefore, the passenger must be instructed on the location of the latch-release actuator or the passenger must personally determine its location without instruction.

A need therefore exists for an armrest telephone assembly which overcomes the aforementioned shortcomings associated with the above-type of dispenser and latching mechanism mounted to an armrest.

SUMMARY OF THE INVENTION

In one particular embodiment, these and other objects are realized by providing an armrest telephone assembly comprising an armrest unit and a telephone handset. The armrest unit includes an upper side and a lower side, and the handset includes a latching mechanism for releasably mounting the handset to the lower side of the armrest unit. A release button is mechanically linked to the latching mechanism in the handset and is constructed and arranged in the armrest unit such that it is visible to a passenger sitting in the seat associated with the armrest unit. In response to a user pressing the release button, the latching mechanism releases the handset from the lower side of the armrest unit to permit the user to use the telephone. In the preferred embodiment, the released handset is retained in close proximity to the lower side of the armrest unit until the user grasps and uses the handset.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Figure 1:
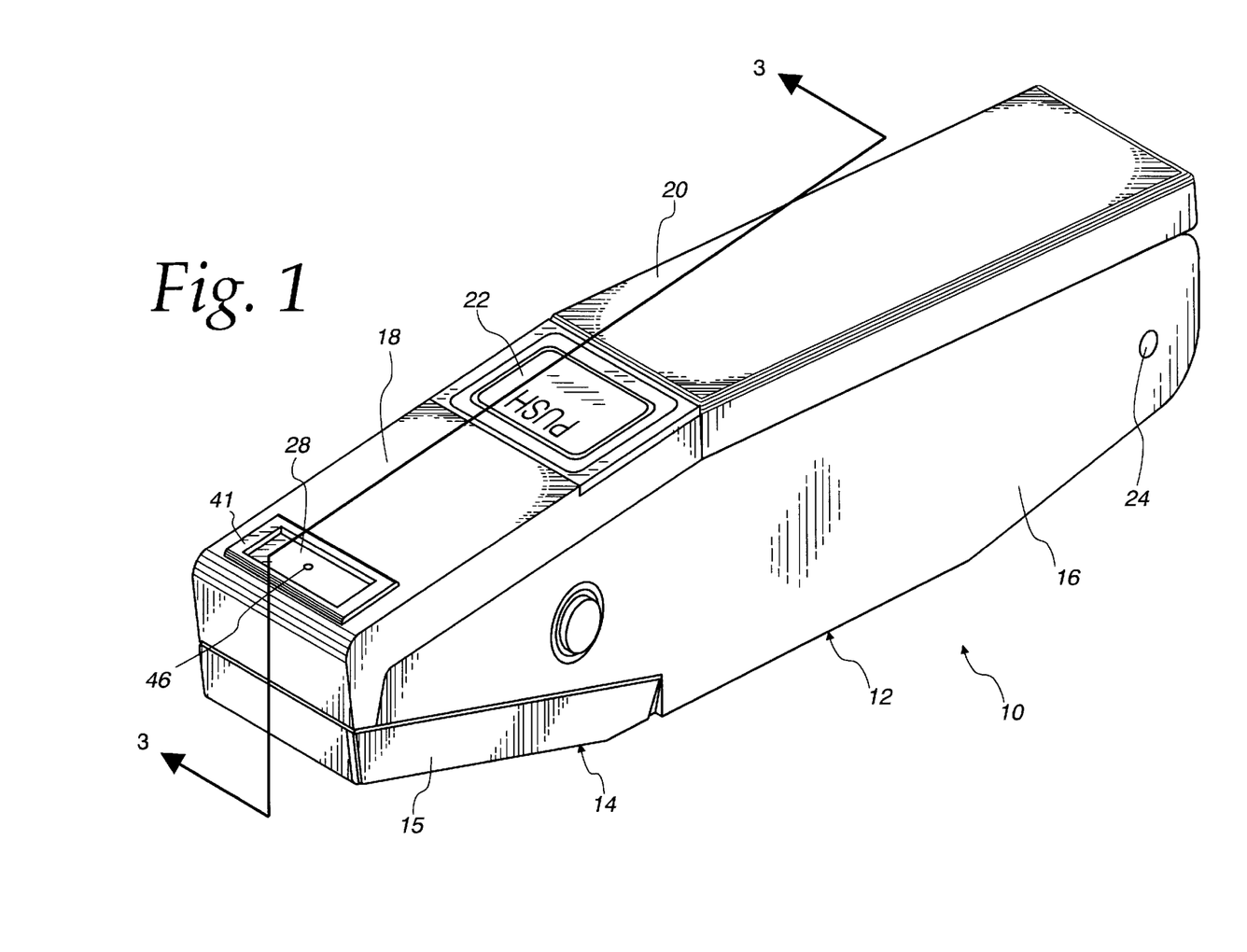
FIG. 1 is a perspective view of an armrest telephone assembly embodying the present invention, showing the telephone handset mounted to the armrest unit prior to actuating a latching mechanism.
Figure 2:
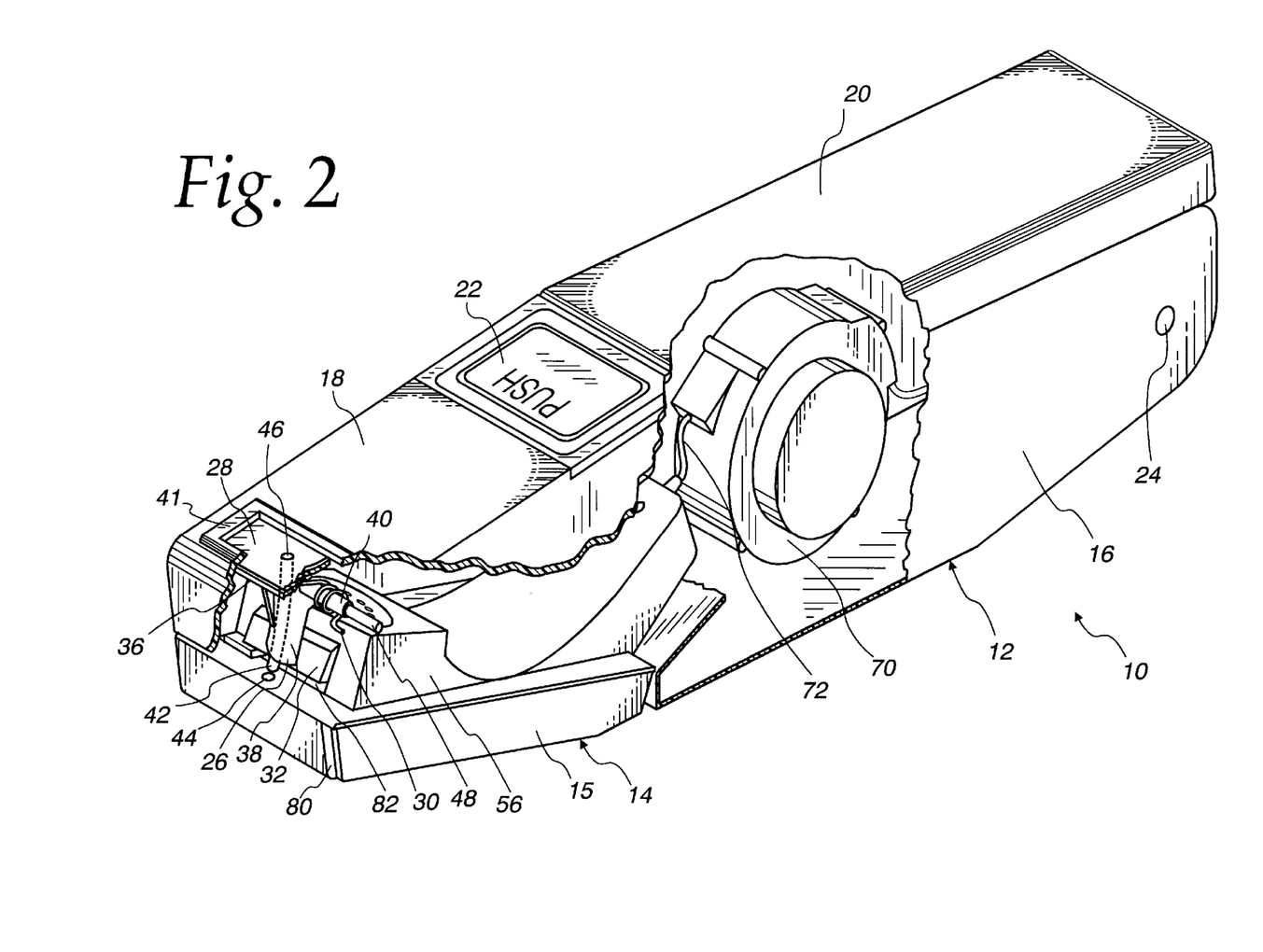
FIG. 2 is a perspective view of the armrest telephone assembly in FIG. 1 with portions broken away to reveal the interior of the assembly.

Turning now to the drawings, FIGS. 1 and 2 illustrate an armrest telephone assembly 10 comprising an armrest unit 12 and a telephone handset 14. The telephone handset 14 includes a molded plastic housing 15. The armrest unit 12 includes an armrest 16, a molded plastic escutcheon 18, and an armcap 20. The armrest 16 is preferably composed of either molded plastic or of sheet metal having a plastic skin. The escutcheon 18 is removably attached to the top front portion of the armrest 16 by means such as screws or bolts. In the preferred embodiment, an ash tray 22 is mounted to the rear portion of the escutcheon 18. The armcap 20 is located adjacent the escutcheon 18 and is removably attached to the top rear portion of the armrest 16. When a passenger rests his or her arm on the armrest unit 12, the passenger typically rests his or her elbow and forearm on the armcap and his or her wrist and hand on the escutcheon. To permit the armrest telephone assembly 10 to be rotated upward from its normal horizontal position in FIGS. 1 and 2 to a vertical position, the armrest 16 is pivotally mounted to a support (not shown) by means of a pivot pin 24 extending through a corresponding pivot hole in the support. In this vertical position, the handset 14 does not protrude outward into the passenger seat area.

To releasably mount the telephone handset 14 to the lower front portion of the armrest 16, the handset 14 is provided with a latching mechanism and the armrest 16 contains a release mechanism for actuating the latching mechanism. As best shown in FIG. 2, the release mechanism includes a release button 26, a label 28, and a torsion spring 30, while the handset latching mechanism includes a latch 32 and a compression spring 34 (see FIG. 3). These elements are described in detail below.

With respect to the release mechanism, the release button 26 is preferably composed of molded plastic and it includes an upper flat section 36, a lower tubular section 38, and a fulcrum 40 integrally formed with each other. The lower tubular section 38 and the fulcrum 40 are located beneath the upper flat section 36. The fulcrum 40 is perpendicular to the lower tubular section 38 and parallel to the upper flat section 36, and the center portion of the fulcrum 40 is adjacent the lower tubular section 38. The label 28 is attached to the top surface of the upper flat section 36 by means such as adhesive. This label 28 is preferably composed of a clear textured plastic which is printed on its top surface with such instructional information as "PRESS TO RELEASE TELEPHONE." To permit the printed information on the label 28 to be visible to a passenger sitting in his or her passenger seat, the escutcheon 18 forms an opening defined by a rectangular periphery 41. The printed information on the label 28 is visible to the passenger through the opening in the escutcheon 18.

The lower tubular section 38 of the release button 26 forms a channel containing a clear polymeric or glass light pipe 42. The light pipe 42 is securely mounted in the lower tubular section 38 by means such as adhesive or inward pressure provided by the walls of the lower tubular section 38. In response to an incoming telephone call, a high output light-emitting diode 44 mounted in the handset 14 emits a beam of colored light (e.g., orange or red light) toward the light pipe 42. The light pipe 42, which is mounted directly above the light emitting diode 44, transmits this beam of light through the lower tubular section 38 and the upper flat section 36 of the release button 26. The label 28 is provided with a clear portion 46 to permit passage of the beam of light through the label 28 such that the light is visible to a passenger looking at the label 28. The clear portion 46 preferably has a cross section which is smaller in size or approximately the same size as the light pipe 42. When a passenger views light through the clear portion 46 of the label 28, the passenger has an incoming call. To instruct the passenger as to the meaning of the light, the words "INCOMING CALL" may be printed on the top surface of the label 28 adjacent the clear portion 46 thereof.

As illustrated in FIGS. 2–5, the light emitting diode 44 is mounted in the handset 14 adjacent the latch 32 which, in turn, is mounted to an ear phone portion 56 of the handset 14. Due to the light pipe 42, any circuitry for informing a passenger of an incoming call is located in the handset 14. Since additional circuitry need not be mounted outside the handset 14, the functional circuitry of the telephone handset 14 is completely integrated therein. This integration of circuitry within the handset 14 facilitates manufacture of the armrest telephone assembly 10 and simplifies the design of the assembly 10. As long as the handset 14 and the release button 26 are arranged in the assembly so that the light pipe 42 is approximately aligned with the light emitting diode 44, a passenger is informed of an incoming call by the emission of a light beam from the light emitting diode 44. The integrated handset 14 avoids the need to separately manufacture and mount external circuitry in the armrest unit 12 and to interface this external circuitry to the circuitry internal to the handset.

In the preferred embodiment, the light pipe 42 is a clear acrylic rod having an outer diameter ranging from 3/16 inch to 1/4 inch. The acrylic rod has a polished outer surface to enhance the light channeling capabilities of the light pipe 42. Polishing the outer surface of the light pipe 42 minimizes the loss of light through the side walls of the light pipe 42 so that the light is clearly visible through the clear portion 46 of the label 28. Alternatively, the light pipe 42 may be composed of other suitable light-carrying clear materials, such as polycarbonate or glass. The light pipe 42 is pre-formed to the shape of the channel within the lower tubular section 38 by either heating and bending a straight rod according to the shape of the channel or by molding the rod to the shape of the channel. As stated above, the light pipe 42 is securely mounted in the lower tubular section 38 by means such as adhesive or wall pressure. In one embodiment, the lower tubular section 38 includes an elongated slot (not shown) in its side wall extending from the upper end to the lower end of the tubular section 38. This elongated slot is sufficiently wide to permit lateral snap-insertion of the light pipe 42 into the tubular section 38 via the elongated slot.

The fulcrum 40 of the release button 26 is used to pivotally mount the release button 26 to the armrest 16. The fulcrum 40 defines a channel for receiving a metal pivot pin 48 which extends between the opposing side walls of the armrest 16. The opposing ends of the pivot pin 48 are securely mounted in apertures formed in respective ones of the armrest side walls so that the pivot pin 48 is held stationary relative to the armrest 16. The channel within the fulcrum 40 is sized to permit the fulcrum 40 to freely rotate above the stationary pivot pin 48. In an alternative embodiment, the escutcheon 18, the armrest 16, and the release button 26 are designed such that the release button 26 is pivotally mounted to the escutcheon 18 instead of the armrest 16.

Figure 3:
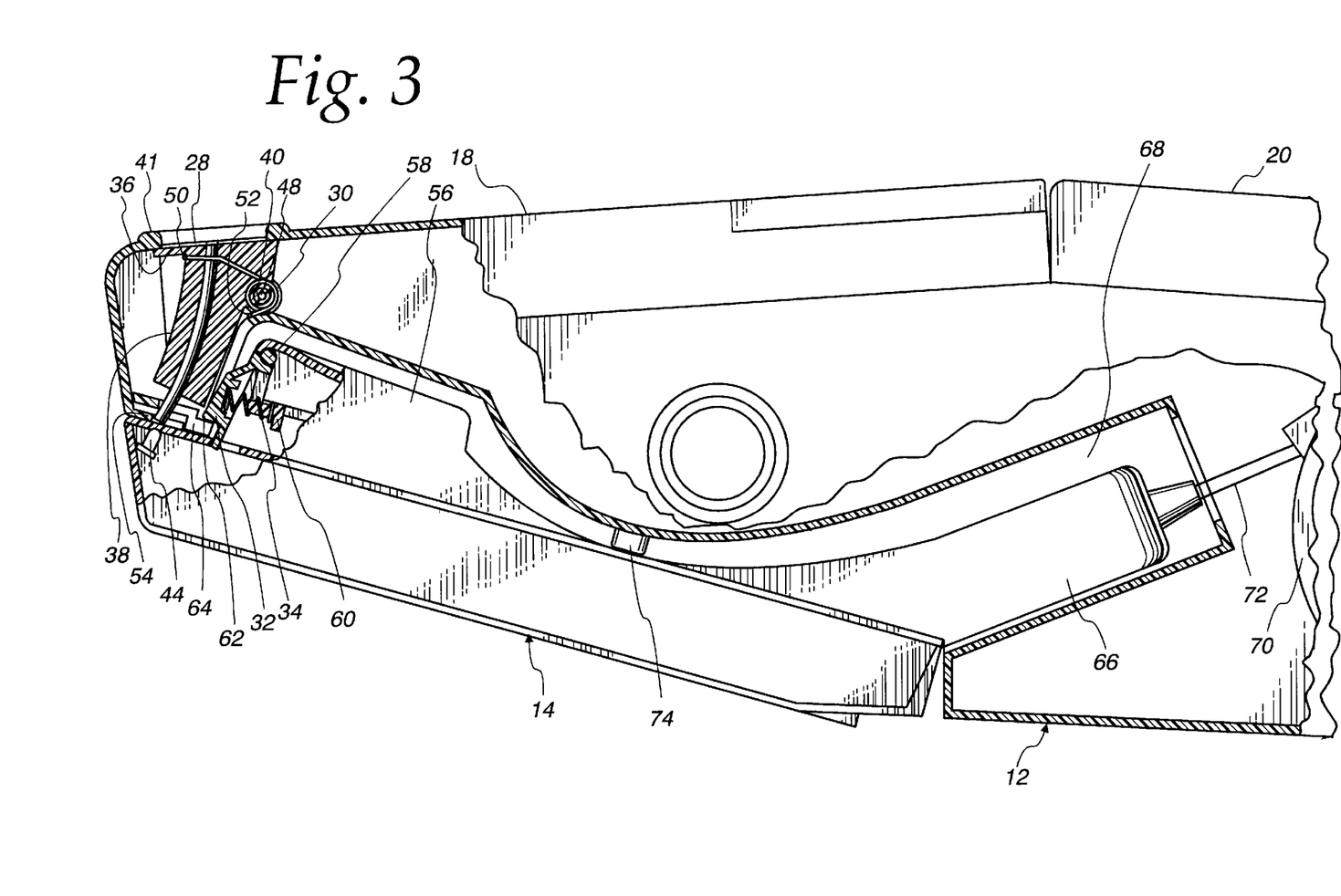
FIG. 3 is a section taken generally along line 3—3 in FIG. 1.
Figure 4:
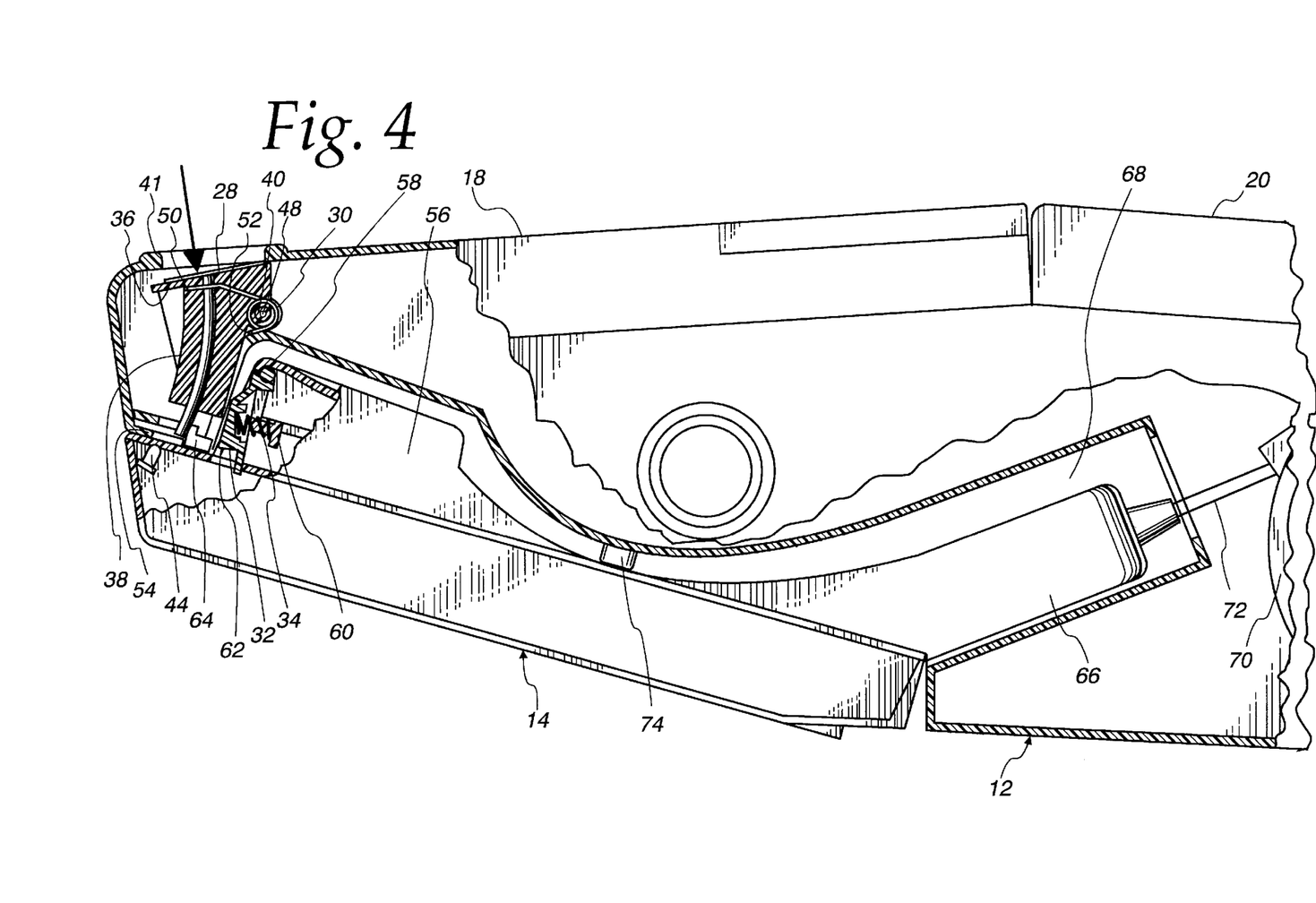
FIG. 4 is a cross-section of the armrest telephone assembly in FIG. 1 showing actuation of the latching mechanism.

The release button 26 is movable between a non-actuated position illustrated in FIGS. 1, 2, 3, and 5 and an actuated position illustrated in FIG. 4. Without pressing the upper flat section 36 of the release button 26, the torsion spring 30 biases the release button 26 toward the non-actuated position. In the non-actuated position, the upper flat section 36 is horizontal (as viewed in FIGS. 3 and 5).

Figure 5:
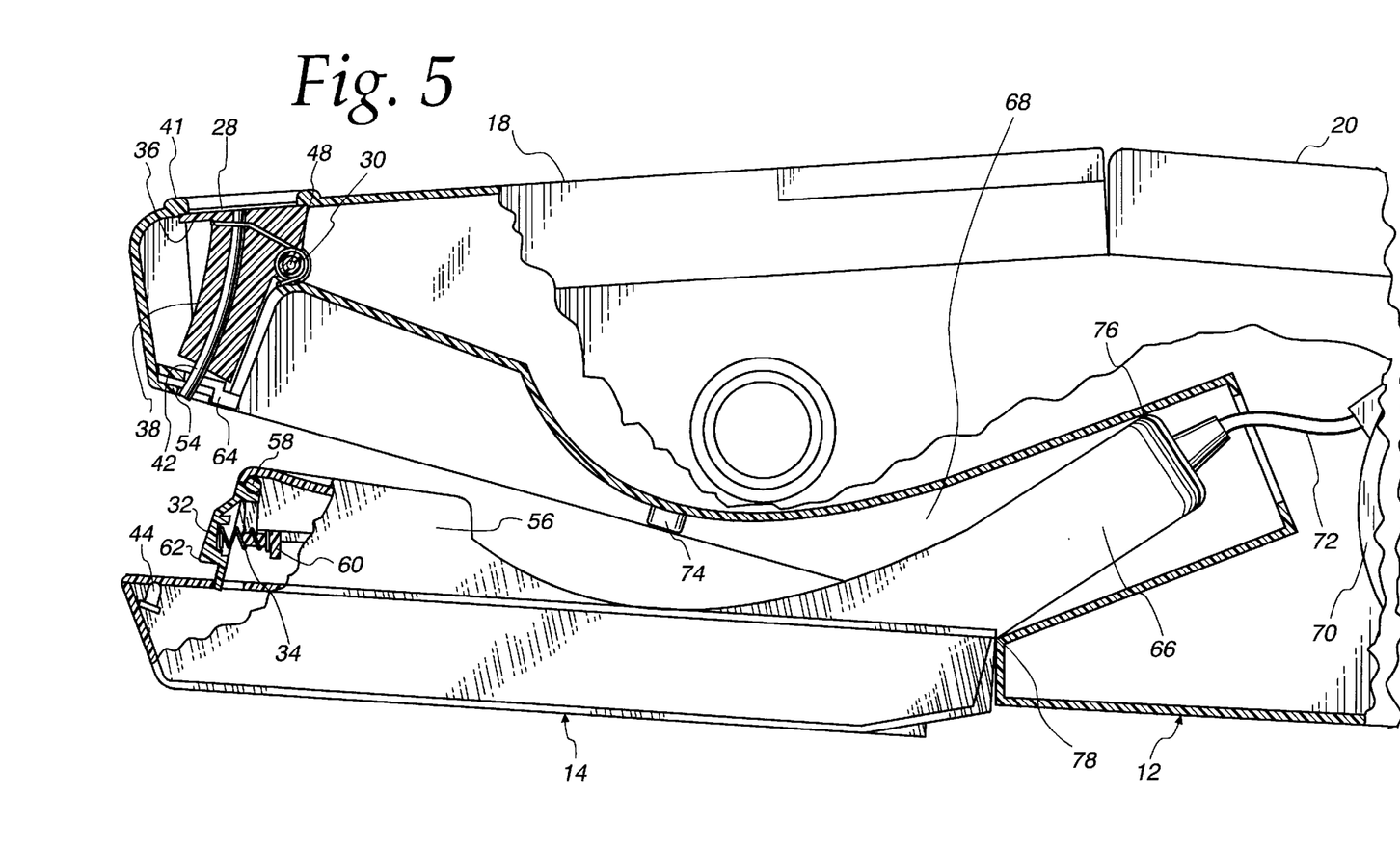
FIG. 5 is a cross-section of the armrest telephone assembly in FIG. 1 showing the telephone handset released from the armrest unit following actuation of the latching mechanism.

Since the torsion spring 30 is conventional, it is not described in detail herein. It suffices to state that the coils of the torsion spring 30 encircle a portion of the fulcrum 40. Moreover, first and second linear end portions 50, 52 of the torsion spring 30, disposed on opposite sides of the coils, bear against portions of the respective release button 26 and the armrest 16 to bias the release button 26 toward the non-actuated position (FIGS. 3 and 5). More specifically, the first linear end 50 of the torsion spring 30 bears against the lower surface of the upper flat section 36 of the release button 26 adjacent the front side of the lower tubular section 38. The second linear end 52 bears against an internal shelf (not shown) formed by the armrest 16.

When the release button 26 is in the non-actuated position, the torsion spring 30 has stored therein a predetermined amount of stress which tends to force the first and second linear ends 50, 52 away from each other. With the second linear end 52 of the torsion spring 30 fixed in place by the armrest 16, the first linear end 50 applies upward force to the upper flat section 36 of the release button 26 so as to bias the release button 26 toward the non-actuated position shown in FIGS. 1, 2, 3, and 5. The release button 26 is prevented from rotating clockwise (as viewed in FIGS. 3 and 5) beyond the non-actuated position by virtue of contact of the front end of the upper flat section 36 with the inner surface of the rectangular periphery 41 of the escutcheon 18. A redundant contact for preventing rotation of the release button 26 beyond the non-actuated position occurs between the lower end of the light pipe 42 and a stop 54 formed by the armrest 16.

The spring-biased release button 26 interacts with the latch 32 in the handset 14 to permit the handset 14 to be released from the lower front portion of the armrest 16. As best shown in FIGS. 3–5, the latch 32 is pivotally mounted to the ear phone portion 56 of the handset 14 by means of a pivot 58. Furthermore, the latch 32 is biased toward an outward position by the compression spring 34. FIGS. 3 and 5 illustrate the latch 32 in the outward position. A first end of the compression spring 34 is fixed to a stationary cylindrical holder 60 mounted within the handset 14, while a second end of the compression spring 34 bears against the inner surface of the latch 32. This second end fits into a cylindrical recess formed by the inner surface of the latch 32 to prevent the second end from sliding relative to the inner surface of the latch 32.

FIGS. 3–5 illustrate the sequence for actuating the latching mechanism so as to release the handset 14 from the armrest 16. FIG. 3 illustrates the handset 14 as being mounted to the armrest 16 with the release button 26 in the non-actuated position and the latch 32 in the outward position. To hold the handset 14 in place, a lower edge 62 of the latch 32 bears against an upper edge of a retaining shelf 64. This retaining shelf 64 prevents the ear phone end of the handset 14 from dropping relative to the armrest 16. To prevent the microphone end 66 of the telephone handset 14 from dropping relative to the armrest 16, the microphone end 66 is positioned within a handset cavity 68 formed by the armrest 16. To assist in retaining the microphone end 66 within the handset cavity 68, the microphone end 66 is connected to a cord reel 70 by means of a cord 72. As best shown in FIG. 2, the cord reel 70 is fixedly mounted within the armrest 16. The cord 72 extends from the handset 14 to the interior of the cord reel 70, where the cord 72 is wound several times about an internal hub. The cord reel 70 preferably applies a retention force to the cord 72 in the direction of the cord reel 70 which, in turn, retains the microphone end 66 of the handset 14 within the handset cavity 68.

To release the handset 14 from the armrest 16, a passenger presses downward on the release button 26 in the direction of the arrow depicted in FIG. 4. This downward pressure causes the release button 26 to rotate counterclockwise (as viewed in FIG. 4) about the pivot pin 48. This counterclockwise rotation, in turn, causes the right side of the lower tubular section 38 of the release button 26 (as viewed in FIG. 4) to apply inward pressure to the latch 32. This inward pressure forces the latch 32 inward, thereby moving the lower edge 62 of the latch 32 off the retaining shelf 64 (FIG. 4). In response to the latch 32 moving off the retaining shelf 64, the telephone handset 14 is released from the armrest 16 and the handset 14 drops to the released position illustrated in FIG. 5.

To lightly push the handset 14 toward the released position, a compression spring or elastomer bumper 74 is mounted to the armrest 16 at a location adjacent the center portion of the handset 14. When the handset 14 is mounted to the armrest 16 (FIG. 3), the bumper 74 is slightly compressed from its natural state so that it applies downward force to the handset 14. The bumper 74 also prevents the handset 14 from shaking or rattling relative to the armrest unit 12 while the handset 14 is latched to the armrest unit 12. In response to actuating the latching mechanism, the bumper 74 releases its stored energy to push the handset 14 toward the released position.

After the latching mechanism is actuated and the passenger removes his or her finger from the release button 26, the torsion spring 30 returns the release button 26 to the non-actuated position and the compression spring 34 returns the latch 32 to its outward position (FIG. 5). A desirable feature of the armrest telephone assembly 10 is that the telephone handset 14 is retained in close proximity to the armrest 16 following actuation of the latching mechanism. The handset 14 does not completely drop away from the armrest 16. FIG. 5 illustrates the released position of the handset 14. To retain the handset 14 in the released position, the cord reel 70 continues to apply a retention force to the cord 72. In addition, as shown in FIG. 5, opposing surfaces of the microphone portion 66 of the handset 14 bear against opposing inner surfaces of the armrest 16 at locations 76, 78. This double-surface contact assists in retaining the handset 14 in the released position. If desired, an elastomer pad (not shown) may be mounted to the inner surface of the armrest 16 at the location 76. This pad increases the friction between the microphone portion 66 and the armrest 16 at the location 76. This increased friction minimizes relative slippage between the microphone portion 66 and the armrest 16 so as to better maintain the handset 14 in the released position illustrated in FIG. 5.

Once the handset 14 is in the released position depicted in FIG. 5, the passenger may grasp and use the telephone handset 14. As the passenger removes the handset 14 from the region beneath the armrest 16, the cord reel 70 dispenses the cord 72. The cord reel 70 preferably contains a sufficient amount of cord to allow the passenger to use the handset 14 while sitting normally in his or her passenger seat. To make a telephone call, the handset 14 preferably includes a credit card slot 80 extending along the length of the handset 14. The passenger slides his or her credit card through the credit card slot 80 and then proceeds with the telephone call.

After using the telephone handset 14, the handset 14 is re-mounted to the armrest 16 as follows. The handset 14 is first placed beneath the armrest 16 in the position illustrated in FIG. 5. As the handset 14 is placed beneath the armrest 16, the cord reel 70 is designed to either automatically retract any excess cord into the cord reel 70 or retract in response to a slight tug of the cord by the passenger.

After placing the handset 14 beneath the armrest 16 as shown in FIG. 5, the passenger presses the handset 14 upward toward the stationary armrest 16. As the handset 14 is pressed toward the armrest 16, the retaining shelf 64 engages the latch 32 and presses the latch 32 inward. The latch 32 remains pressed inward until the lower edge of the latch 32 moves upward beyond the retaining shelf 64. In response to the latch 32 moving beyond the retaining shelf 64, the compression spring 34 causes the latch 32 to return to the outward position illustrated in FIG. 3. With the lower edge 62 of the latch 32 bearing against the upper edge of the retaining shelf 64, the handset 14 is securely mounted to the armrest 16.

To minimize EMI emissions from the handset 14, the inner surface of the handset housing 15 is coated with conductive paint or electroplating. In addition, EMI coating is preferably applied to both the inner surface of the latch 32 and a lower front surface 82 of the latch 32 (FIG. 2). This EMI coating on the latch 32 minimizes EMI emissions through the handset housing 15 at the location of the latch 32.

It can be seen from the foregoing detailed description and FIGS. 1–5 that the armrest telephone assembly 10 is compact, unobtrusive, and aesthetically pleasing. The handset 14 is mounted directly to the armrest unit 12 without the use of a separate handset dispenser. If the armrest 16 is rotated upward from its normal horizontal position to a vertical position, the handset 14 does not protrude outward into the passenger seat area. Therefore, the comfort of the passenger is maximized. The armrest telephone assembly 10 is easy to adapt and customize for armrests having different configurations. Moreover, the armrest telephone assembly 10 is easily accessible and operable. The release button 26 is visible to a passenger sitting in the seat associated with the armrest telephone assembly 10 and is easily operated by pressing downward on the release button 26.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. An armrest telephone assembly, comprising:

an armrest unit including an upper side and a lower side, said armrest unit having a release mechanism mounted therein: and a telephone handset including a latching mechanism for releasably mounting said handset to said lower side of said armrest unit, said release mechanism of said armrest unit being mechanically linked to said latching mechanism of said handset such that said latching mechanism releases said handset from said lower side of said armrest unit in response to actuation of said release mechanism, wherein said release mechanism includes a light pipe mounted therein, said light pipe extending between said upper and lower sides of said armrest unit, and wherein said handset includes a light source mounted therein for emitting light in response to an incoming telephone call, said light pipe being mounted in said release mechanism above said light source such that said light pipe transmits said emitted light from said lower side to said upper side of said armrest unit.

2. The armrest telephone assembly of claim 1, wherein said release mechanism includes a release button having an upper flat section and a lower tubular section located beneath said upper flat section, said lower tubular section forming a channel containing said light pipe.

3. The armrest telephone assembly of claim 1, wherein said light pipe is a clear polymeric or glass rod.

4. The armrest telephone assembly of claim 2, wherein said release mechanism includes a label connected to a top surface of said upper flat section, said light pipe extending through said upper flat section to said top surface, said label including a clear portion for permitting transmission therethrough of the light transmitted through said light pipe.

5. An armrest telephone assembly, comprising:

an armrest unit having first and second sides, said armrest unit having a release mechanism mounted therein, said release mechanism containing a light pipe extending between said first and second sides of said armrest unit; and a telephone handset releasably mounted to said armrest unit, said handset being released from said armrest unit in response to actuation of said release mechanism, said handset including a light source mounted therein for emitting light in response to an incoming telephone call, said light pipe including one end disposed generally adjacent to said light source such that said light pipe transmits said emitted light between said first and second sides of said armrest unit.

\* \* \* \* \*